Jacob Rabinow
INVENTOR

BY Joseph A. Genovese
ATTORNEY

Dec. 1, 1964 J. RABINOW 3,159,814

SCAN SYSTEMS

Filed May 26, 1960 2 Sheets-Sheet 2

Jacob Rabinow
INVENTOR

BY Joseph A. Genovese
ATTORNEY 3,159,814
SCAN SYSTEMS
Jacob Rabinow, Takoma Park, Md., assignor to Control Data Corporation, Minneapolis, Minn., a corporation of Minnesota
Filed May 26, 1960, Ser. No. 32,004
16 Claims. (Cl. 340—146.3)

The invention relates to character recognition devices and more particularly to scan systems having general utility, but which are especially useful in character recognition devices or reading machines.

Although there are a number of known scanning techniques, my invention deals with various scans by a scan element caused to move over the area to generate an electrical voltage each time that the scan element falls upon a part of the area where there is a change in light intensity. For example, a black character on a white area enables each scan line to detect the places where the scan lines cross the character and produce a signal pattern which represents the particular character. Such a pattern which is first a light pattern and then converted to an electrical pattern, may be fed to a number of different types of devices for useful processing. A generalization of the processing devices include the registers of the reading machine using computer techniques.

In order to obtain a usable pattern of the character by known scan techniques the scan lines must be very close, and in fact, there often is slight overlap of the lines. This is expensive in terms of time required to scan an area, scan apparatus and registers. It is not practical to try to reduce the scan line requirement by enlarging the spot of light because poor signal-to-noise ratios result. The scan element, generally speaking, should be equal to the width of an elemental line of the character being scanned.

Accordingly, an object of the invention is to provide a much more efficient method and apparatus for scanning a character on an area.

My scan system requires many less lines than the usual scan procedure by extracting only as much information as is required, and discarding a great deal of useless information. Also, the information obtained is in a far more useful form. I use a small scan element which yields a maximum signal-to-noise ratio. Furthermore, my system requires only a small fraction of the usual number of scan lines, so that the character can be scanned more quickly and can be processed by far less equipment.

One of the concepts of the invention is to scan the area with spaced lines so arranged that they cover the area in more than one direction to obtain information convertible to a useful electrical signal when a scan line crosses a line or other part of a given character. By suitable design of the scan system there is no danger of completely missing any significant line of the character. This is particularly advantageous when the character is made of very fine lines.

I am aware of Patent No. 2,741,312 issued to Johnson where a character is physically "scanned" by contacting means. In the teaching of this invention, the character has to be uniquely positioned relative to two reference dots. While the patent specifically refers to seven elements of contacting the character, it is obvious that the seven elements comprise three straight lines where two of the lines are parallel and a third is perpendicular to both, and where the three lines intersect at the two dots mentioned. Patent No. 2,930,899 issued to Lyon shows the optical equivalent of Johnson's device. Here, however, the dots have been eliminated by requiring rigorous positioning of the character relative to the scan. The scan lines in both patents are very efficiently used but at the penalty of requiring that the character be specifically oriented relative to the three lines. In the practice of the art as it has developed to date, such precise positioning is impractical, and where very high speed reading is desired, a more general and powerful approach must be used. Accordingly, I have invented a sampling scanning scheme which does not require that the characters be specifically positioned relative to the scan elements. This scheme is applicable not only to numerals and a few alphabetic characters as is the case in the above cited inventions, but to characters in general or for that matter, to other pictorial symbols. The main purpose of the invention is that by properly spacing the scan elements and arranging their positions relative to each other, it is possible to sample an area of interest by covering only a fraction of it and yet be sure that no significant portion of the character of interest is overlooked. This is possible because characters of all languages with which I am familiar consist of lines and that the shapes of these lines are such, that we need not be concerned with very small portions of each character line. This is another way of saying that the radius of curvatures of these lines are generally large and that by sampling each line at only a few points, one can obtain sufficient information to define the line well enough for the purposes of reading.

Sampling systems such as described in this specification do, of course, contain the danger that if it should happen that a character is formed of small discrete elements such as, for example, small dots, the scan systems may miss the character either partially or wholly. Fortunately, the vast majority of characters are formed of continuous lines and the sampling system provides an efficient and rapid method of detecting enough of the character to fully determine it.

It should be clearly understood that the design of any particular scan for a specific purpose should be based on the problem at hand. For example, the thickness of the scan element should be commensurate with the thickness of the character lines, and the spacing between scan elements should be small relative to the over-all size of the character, and the shape of the scan elements and their position should be such that the characters of interest cannot escape the scanning system.

Another object of the invention is to provide a method and apparatus producing separate scan patterns of comparatively widely spaced lines, with the patterns at an angle to each other. The information obtained in this way may be fed to a data processor, for instance one or more registers of a computer, and when so applied, it will be a representation of the character generated as discrete points on the register matrix.

My system merely samples the character and detects widely spaced crossing points of the character as opposed to attempting to obtain information resulting from a complete area scan or blanket coverage of the character. There are many ways to practice the invention, and perhaps one of the simplest is to scan the same character twice with the scan patterns at an angle (usually 90°) to each other. The information so obtained i.e. by sampling as opposed to blanket coverage, is much like a plot of the character on a cross-hatched graph with points arranged along X and Y axes which provide coordinate position information of the examined points. Another method in accordance with my invention, requires only a single scan pattern with contorted, spaced interlaced lines. In such an arrangement, portions of each scan line are at an angle to one another.

My scan systems are primarily described in terms of optical practices, however, many forms of my invention are as well suited for scanning magnetic characters as optical scanning, while remaining within the principles of the invention.

Another object of the invention is to provide a scan system which has a small number of scan lines so arranged that the information obtained in scanning a character provides character sample points arranged as a graphic representation of the character, providing a corresponding electrical signal representation to be fed to a computer or an intermediate computer input device such as a reading machine.

One of the features of the invention may be expressed in terms of the light spot or scan element size in comparison to scan line spacing. The spacing is made large in comparison to the spot diameter or scan line width. The advantages are many; my scan system is rapid, simple and reliable even for exceedingly thin line characters.

Although the term "character" is used herein, it is to be clearly understood that this term is not limited to letters or numbers. The principles of my invention apply to general recognition regardless of whether lines, maps, fingerprints, letters, numbers, codes, photographs, pictures, drawings and many others are involved.

Other objects and features of importance will become apparent in following the description of the illustrated forms of the invention.

Figure 1:
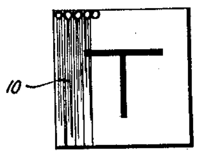
FIGURE 1 is a diagrammatic elevational view showing a character on an area being scanned by a typical, conventional scan system.

In the accompanying drawings attention is first invited to FIGURES 1, 2, 2A, and 2B. FIGURE 1 shows a character on an area, and a scan pattern 10 being generated by very closely spaced scan elements. When pattern 10 is complete for the area, it will consist of a large number of closely spaced vertical lines. The number of lines may be reduced by using a wide diameter spot to generate the scan pattern 10, but this would still generate a pattern where the comparatively wide lines are closely packed on the area.

Figure 2:
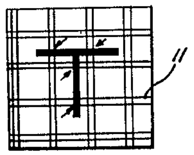
FIGURE 2 is a diagrammatic elevational view showing the same character on an area with the scan element forming a cross-hatch pattern of the area containing the character, the scan element-character crossing points being indicated by arrows.

FIGURE 2 shows scan pattern 11 for an area containing a character. This figure shows the scan elements spaced apart quite considerably. However, the scan pattern is made of scan elements arranged at an angle to each other so that the area is effectively scanned in a cross-hatched pattern. FIGURE 2B shows an area having a different character made of very thin lines, being scanned. In both FIGURES 2 and 2B, the scan is by a sampling technique and not by a blanket coverage as in FIGURE 1.

Figure 2A:
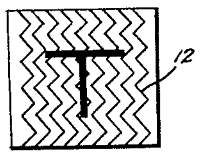
FIGURE 2A is a diagrammatic elevational view showing again, the same character being scanned by scan elements forming a pattern slightly different from that shown in FIGURE 2 but following the principles of the invention.
Figures 2B, 5:
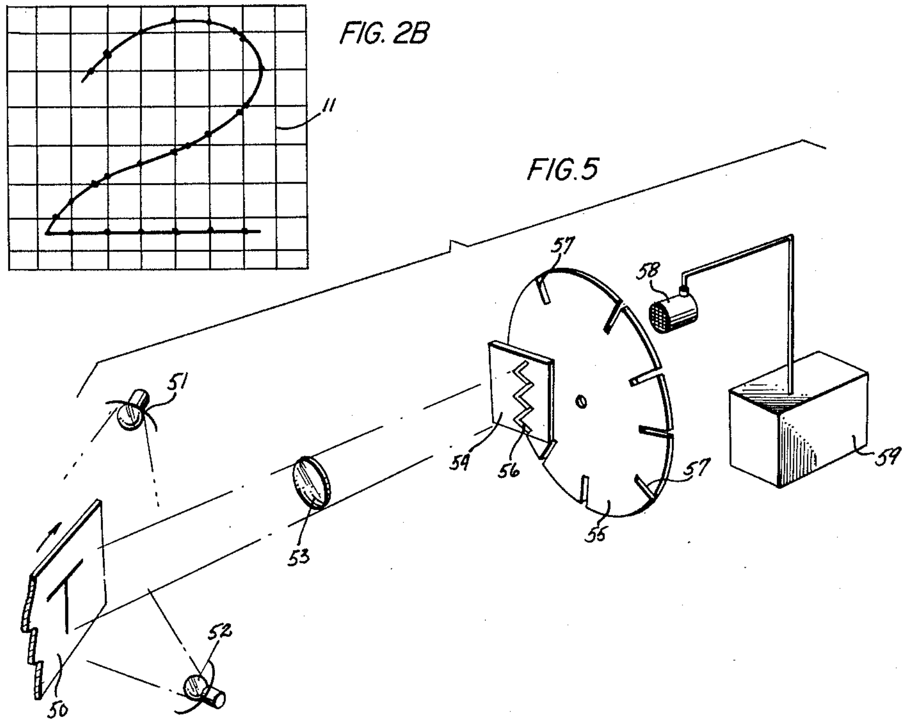
FIGURE 2B is another diagrammatic view showing a very thin line character being scanned by scan elements which sample the character to obtain a number of information points sufficient to identify the character.
FIGURE 5 is a diagrammatic perspective view showing a scanning system capable of producing a scan pattern over an area such as shown in FIGURE 2A.

FIGURE 2A shows an area having a character and provided with a scan pattern 12 further exemplifying the invention. Pattern 11 is formed of two groups of intersecting scan elements, while pattern 12 is made of a single scan. However each scan element of pattern 12 is of a wavy shape with the peaks of one element located partially within the valleys of the adjacent element. The configuration of the elements of pattern 12 permit the entire area to be scanned but with a small number of scan lines. Practical space limitations prevent illustration of all possible configurations of scan patterns and therefore the patterns 11 and 12 merely diagrammatically represent two possible configurations, and they are certainly not the only ways that the character may be scanned by using a comparatively small number of scan elements to sample scan and yet obtain information regarding the character in a much more usable form with minimal data processing equipment.

Figures 3, 3A, 4:
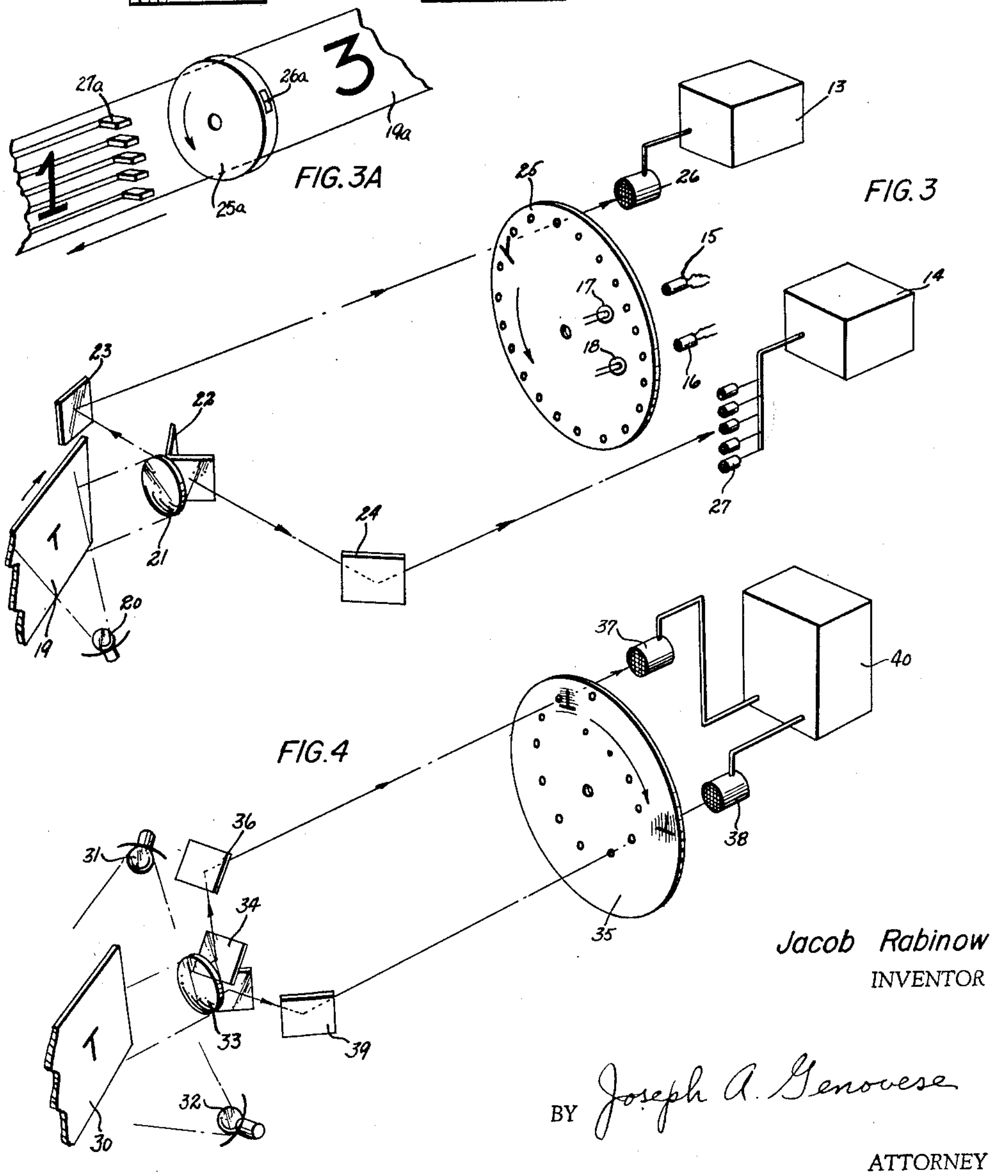
FIGURE 3 is a diagrammatic perspective view showing a scan system capable of producing various scanning such as shown in FIGURES 2 and 2B.
FIGURE 3A is a diagrammatic perspective view showing a scan system analogous to FIGURE 3 but capable of magnetic scanning.
FIGURE 4 is a diagrammatic perspective view showing a modification of the scanning system.

The scan system of FIGURE 3 shows data processing equipment into which electrical signals are fed. For example, the drawing shows registers 13 and 14 of a computer input reading machine, the details of which form no part of the invention. The same holds true for photocells 15 and 16 together with their light sources 17 and 18. A scanning disk 25 is located between the light sources and photocells, and the purpose of the photocells 15 and 16 is to yield "begin scan" and "end scan" control signals to begin and end the information cycle of each scan. The electrical control signals are appropriately applied to the computer in the usual way.

The target area 19 to be scanned has a character thereon. For example, the area 19 may be composed of white paper and the character printed, typewritten, etc. thereon. For the purpose of FIGURE 3 it is assumed that area 19 is moving in the direction of the arrow in order to obtain one direction of movement for the scan. Further, the area is illuminated by lamp 20 and a projection lens 21 employs light reflected from area 19 to project the image of the character. An image divider 22 made of prisms or angularly placed mirrors, reflects two images of the character which are re-reflected by the reflecting surfaces of mirrors 23 and 24 or the equivalent.

One image of the pair is directed by mirror 23 onto the face of scanning disk 25 which has a circular group of apertures. When the disk rotates the image of the character is scanned essentially vertically, and the movement of the area 19 provides the horizontal motion required to obtain the vertical lines in pattern 11 (FIGURES 2 and 2B). Light and no light conditions are obtained on the pickup device 26 to convert the light pattern into an electrical signal voltage pattern. Pickup device 26 is a commercially available photomultiplier or the equivalent, and it is operatively connected to register 13.

In order to obtain the horizontal lines of scan pattern 11, the other image of the pair projected from divider 22, falls upon the faces of a group of pickup devices 27. These, too, are commercially available photosensitive devices such as photocells, and they are operatively connected with the register 14. The horizontal motion of the character of area 19 causes the image to move across the face of photocells 27 thereby producing the horizontal scan elements of FIGURES 2 and 2B.

Although the terms "horizontal" and "vertical" are used, this is merely a matter of convenience of expression and it is quite evident that the directions need not be truly vertical or horizontal. In fact, the "vertical" lines in pattern 11 will not be absolutely vertical since the apertures of disk 25 move in an arcuate path, however, for all practical purposes they may be considered vertical especially if the diameter of disk 25 is large and the image being scanned is small.

FIGURE 3A shows a system which is analogous to the scan system of FIGURE 3. The distinctions are that area $19a$ contains characters made of magnetic ink or the like, and the transducers are magnetic heads instead of photo-sensitive devices. One scan direction is obtained by moving the area past a group 27a of pick up devices, and the other direction is obtained by pickup device 26a secured to a rotary disk 25a. The pickup 26a scans the area 19a laterally (at right angles to the direction of motion) similar to the rotary scan heads disclosed in a number of patents which record and play back sound and television picture data by lateral scanning. The system shown in FIGURE 3A, though, scans a given area by the system of sampling the area with widely spaced scan elements, following the same concept as the optical systems disclosed herein, and one of the reasons for FIGURE 3A is to show the correspondence between magnetic and optical practices of my invention, not only as applied to FIGURES 3 and 3A, but also numerous other forms of the invention.

FIGURE 4 shows a scan system wherein it is unnecessary to move the character area 30. The area 30 is illuminated by two sources 31 and 32 of illumination and the reflected light passes through projection lens 33. Image divider 34 is the same as image divider 22, except that one image of the pair is optically rotated 90° as shown on the face of scanning disk 35. The optical rotation of one of the images may be achieved in several ways involving rudimentary light reflecting surface arrangements, one of which is shown.

One image of the character is reflected by a mirror 36 or the equivalent, and it is projected on the face of scanning disk 35. The scanning disk has a group of apertures arranged in a spiral whereby the image under discussion is horizontally scanned. The other image of the pair projected from divider 34 is vertically scanned by means of the same group of apertures in disk 35.

Pickup devices 37 and 38 are located behind scanning disk 35 and they are aligned with reflecting mirrors 36 and 39 to accept the light scan generated by the disk apertures crossing the images projected on the disk. Pickup devices 37 and 38 are operatively connected with data processing equipment diagrammatically represented by register 40.

One of the features of the system shown in FIGURE 4 is that the positions of the pickup devices 37 and 38 may be exchanged for sources 31 and 32 of illumination, and with minor modification of the optical system the scanning information may be obtained from area 30. In such an arrangement disk 35 together with the sources of illumination therebehind, constitutes a flying spot scanner. In order to separate the information obtained from light reflected from area 30, the pickup devices will be each sensitive to a particular color, and the sources of illumination are selected to be rich in the particular colors.

FIGURE 5 shows a system where character area 50 is a moving area illuminated by sources 51 and 52 of light. In this form of my invention only one set of scan elements is required (FIGURE 2A) with the elements comparatively widely spaced and made of exceedingly thin lines. The thin lines have the advantage of a high, favorable signal-to-noise ratio, and the fact that the scan elements of pattern 12 are all in one direction, avoids the necessity of separate scans even though both scans may be made simultaneously as shown in FIGURES 3 and 4.

The image of the character on area 50 is projected by lens 53 onto mask 54 located in front of scanning disk 55. A zig-zag slot 56 is in mask 54, and there is a group of slotted apertures 57 in the periphery of or the peripheral portion of disk 55. The zig-zag slot 56 may be made in a number of configurations, for instance as shown or as a sine-wave, epicycloidal, etc.

Photoelectric pickup device 58 is located behind disk 55 and is in alignment with the image of the character projected on mask 54. Pickup device 58 is operatively connected with data processing equipment diagrammatically represented as register 59.

When disk 55 rotates, the registration of a single slot 57 with slot 56 causes the image of the character to be scanned along a line of a shape identical to the configuration of slot 56. The motion of area 50 as shown by the arrow provides the necessary movement of the character for successive scans achieved by the registration of successive slots 57 with slot 56.

Figure 6:
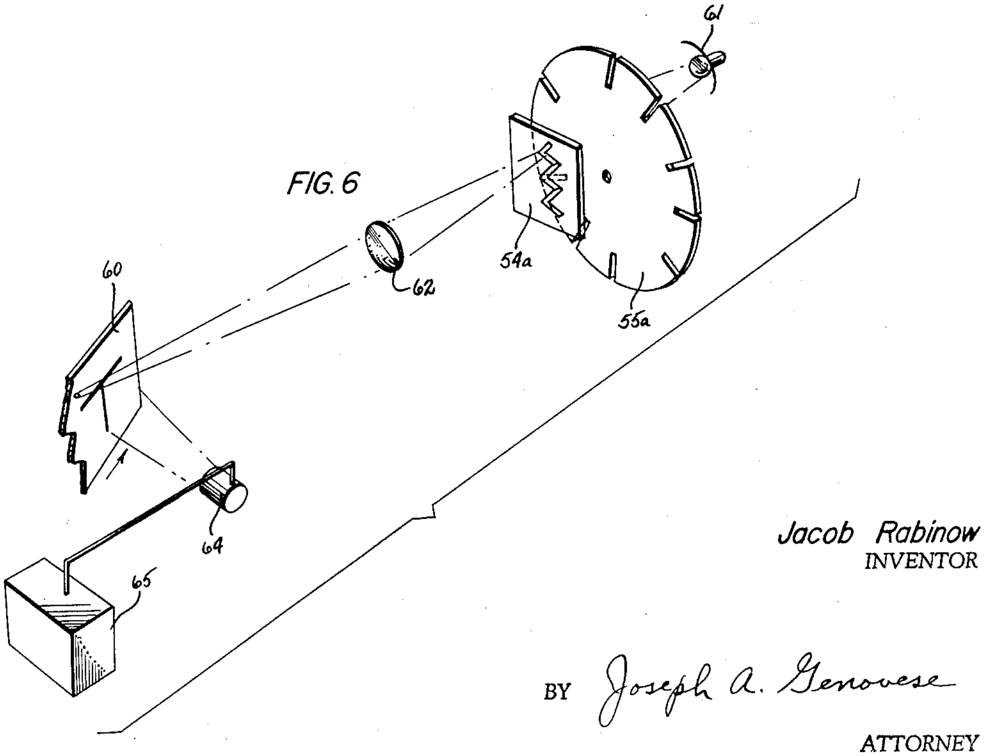
FIGURE 6 is a diagrammatic perspective view showing a modification of the system of FIGURE 5.

FIGURE 6 discloses a system wherein the area 60 having a character thereon, is scanned with a spot of light. In this arrangement, source 61 of illumination is located behind scanning disk 55a, and the disk is interposed between source 61 and slotted mask 54a. Focusing lens 62 is disposed between mask 54a and area 60 to focus the light to a small spot so that the area is scanned by very narrow scan elements. The configuration of the slot in mask 54a assures that the scan elements have portions at an angle to each other, and the interlace feature of the scan elements assures scan-sampling of the entire area 60 so that significant lines of the character on the area are crossed.

Photoelectric pickup device 64 is operatively connected with data processing equipment, for example register 65 of a computer or computer input device. Light reflected from area 60 is gathered by a light gathering lens (not shown) and falls upon the face of the pickup device 64 whereby the light modulated with information in the form of intensity changes responding to the particular shape of the character, may be transduced to an electrical signal for feeding register 65.

In order that the principles of the invention are not obscured by well known details of optics, a number of lens required for more refined operation are not shown nor described. For instance, it is often desirable to use light gathering lens, but these are so well known that they are omitted. In other instances the light source and photoelectric pickup devices may be easily exchanged, for example compare FIGURES 5 and 6. In some situations exchange of the light source position and photoelectric pickup devices may use color discrimination such as described previously in connection with the modification of FIGURE 5. In all instances, however, the scan systems following the principles of the invention obtain selected, sample information of the configuration of the character instead of endeavoring to obtain a blanket type information, thereby materially achieving economy in the computer and also the reading machine which is usually an input device for a computer.

Other modifications, variations and changes may be made without departing from the protection afforded by the following claims.

I claim:

1. In a character reading machine having register means, a character sampling scan system for a randomly positioned character comprising means for scanning a character with a scanning element having successive positions relative to the character and producing a scan field larger than the character, the element-to-character motion forming contorted and interlaced lines across the character which are spaced widely in comparison to the size of the element, and means fed by the elemental differences detected by the scan system to generate a signal voltage for feeding said register means each time that a scan line crosses an element of the character.

2. The scan system of claim 1 wherein said scan lines are contorted and interlaced such that the peaks of each line are within a line defining the valleys of adjacent lines.

3. In a scanning system for scanning an area containing a character, first scan means for scanning the character, and second scan means operable concurrently with said first scan means for scanning the character at an angle to the scan of the first scan means, each of said scan means producing a plurality of scan elements and providing position information of each crossing of any portion of the character.

4. The scanning system of claim 3 wherein the spacing of said elements is small enough to detect all of the significant features of the character and said spacing being large in relation to the unwanted or unnecessary detail of the character.

5. The scanning system of claim 3 wherein the scan elements of said first scan means are at an angle of approximately ninety degrees to the scan elements of said second scan means.

6. In a scanning system for a randomly positioned character on an area, means projecting two images of the area, first scan means for scanning one of said images and providing information outputs, and second means for simultaneously scanning the other image at an angle to the scan of the first scan means and providing further information outputs, both of said scanning means cooperating to provide co-ordinate position information of each crossing of any portion of the character by the scan lines.

7. The scanning system of claim 6 wherein said first scan means produce spaced scan elements of which a plurality cross said character, and said second scan means produce spaced scan elements of which a plurality cross said character.

8. Apparatus to scan a moving area comprising means to illuminate the area, means for projecting a plurality of images of said area using the light reflected from said area, fixed scan means for one of the images, said scan means being traversed by one image of the moving area, second scan means for the other of the images, said second scan means being movable with respect to the said other image so that its scan direction is at an angle to the scan of the said fixed means.

9. Apparatus to scan a moving area by relying at least in part on the movement of the area, said apparatus including a first information-output scan means which scans by adjacent lines, and second information-output scan means responsive to the movement of the area for scanning by adjacent lines at an angle to the first scan, and both of said scan means being operable concurrently to examine said area.

10. A scan system for a character on a contrasting area, said scan system comprising optical means to project an image of the area, an image dividing means optically coupled to said projecting means to divide the image into a pair of images for concurrent examination, means to scan one of the images of said pair, and means to scan the other image of said pair at the same time that said one image is being scanned but in a direction angularly displaced from the first-mentioned scan means, means to move the area, and the movement of the area co-operating with at least one of said scan means in the operation thereof to produce the scan pattern of the area.

11. A scan system to load a computer with information identifying the points and positions of a randomly positioned character on a contrasting area comprising optical means to produce separate images of the area, first means for scanning one image along widely spaced lines, second means operable simultaneously with said first means, for scanning another of the images along widely spaced lines at an angle to the first-mentioned lines, and means operatively connecting the outputs of each of said scan means with the computer.

12. A scan system for an area containing a magnetic character, means including magnetic heads to generate a scan pattern composed of a plurality of lines covering said area, and at least portions of some of said lines being at an angle to portions of others of said lines.

13. Scan apparatus for a character on an area, said apparatus comprising first scan means to investigate the character by successive discrete scan elements in a first direction and to produce information outputs indicative of the scan element crossings of the character, and second scan means operable simultaneously with said first scan means to investigate the character by successive discrete scan elements at the same time as the investigation by said first scan means but at an angle to said first direction to produce information outputs indicative of the scan element crossings of the character.

14. Scan apparatus according to claim 13 wherein said first and second scan means are color sensitive for color discrimination between said first and second scan means.

15. Scan apparatus for a character on an area, projection means to project a plurality of complete images of the character and its area, first scan means producing a plurality of scan lines for one image and providing information outputs indicating the scan line crossings of the character image, and second scan means concurrently operative with said first scan means for producing a plurality of scan lines for another of said images and providing additional information outputs indicating the scan line crossings of the character by the lines of said second scan means.

16. Scan apparatus according to claim 15 wherein said second scan means produces its scan lines at an angle to the scan lines produced by said first scan means.

References Cited by the Examiner

UNITED STATES PATENTS

| | | | |
|---|---|---|---|
| 1,834,330 | 12/31 | Brower | 178—7.6 |
| 2,838,602 | 6/58 | Sprick | 340—149 |
| 2,918,653 | 12/59 | Relis | 340—149 |
| 2,919,426 | 12/59 | Rohland | 340—149 |
| 2,927,216 | 3/60 | Lohninger | 340—149 |
| 2,930,899 | 3/60 | Lyon et al. | 340—146.3 |
| 2,956,264 | 10/60 | Rohland et al. | 340—146.3 |

MALCOLM A. MORRISON, *Primary Examiner.*

EVERETT R. REYNOLDS, NEIL C. READ, *Examiners.*